United States Patent [19]

Pals

[11] 4,134,963
[45] Jan. 16, 1979

[54] PRODUCTION OF LOW DENSITY GRANULAR SODIUM TRIPOLYPHOSPHATE

[75] Inventor: Raimond Pals, Howell, N.J.

[73] Assignee: FMC Corporation, Philadelphia, Pa.

[21] Appl. No.: 748,003

[22] Filed: Dec. 6, 1976

[51] Int. Cl.$^2$ .................... C01B 15/16; C01B 25/26
[52] U.S. Cl. ..................................... 423/315; 423/305
[58] Field of Search .............................. 423/315, 305

[56] References Cited

U.S. PATENT DOCUMENTS

| | | | |
|---|---|---|---|
| 3,054,656 | 9/1962 | Cassidy et al. | 423/315 |
| 3,356,447 | 12/1967 | Tafler | 423/315 |
| 3,650,685 | 3/1972 | Dyer et al. | 423/305 |
| 3,761,573 | 9/1973 | Hinz et al. | 423/315 |
| 3,932,590 | 1/1976 | Pals et al. | 423/315 |

FOREIGN PATENT DOCUMENTS 797732  10/1968  Canada .................................... 423/315

Primary Examiner—O. R. Vertiz
Assistant Examiner—Gregory A. Heller
Attorney, Agent, or Firm—Christine M. Miles; Frank Ianno

[57] ABSTRACT

Finely divided sodium tripolyphosphate (STPP) particles are sprayed with water in an amount from about 36% to about 130% in excess of the amount stoichiometrically required for formation of sodium tripolyphosphate hexahydrate to form an agglomerated product which is then calcined to a temperature within the range of from about 320° C to about 550° C to produce a granular sodium tripolyphosphate product of low bulk density and low frangibility.

4 Claims, No Drawings

PRODUCTION OF LOW DENSITY GRANULAR SODIUM TRIPOLYPHOSPHATE

The present invention relates to a process for preparing a granular sodium tripolyphosphate (STPP) product of low bulk density and low frangibility from a finely divided STPP feed material.

In the formulation of modern detergent compositions, granular STPP has come into widespread use as a phosphate "builder" which increases the cleaning ability of these detergent compositions. The classic method for producing STPP is to react phosphoric acid and an alkaline compound such as sodium hydroxide or sodium carbonate together in an aqueous solution such that the molar ratio of sodium to phosphorus is on the order of about 1.67. This reaction results in the formation of an aqueous mixture containing monosodium orthophosphate and disodium orthophosphate in a mole ratio of about 1:2. The free water is removed from the phosphate mixture by passing it through a heating zone where it is progressively heated to higher temperatures. At a temperature of about 250° C. or higher, STPP is formed. While the exact mole ratio of sodium to phosphorus which is employed may be varied, the ultimate reaction takes place in accordance with the following equation:

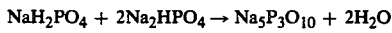

$$NaH_2PO_4 + 2Na_2HPO_4 \rightarrow Na_5P_3O_{10} + 2H_2O$$

The resulting STPP is a crystalline anhydrous product capable of having two physical forms. Form I is produced in rotary kilns at temperatures of from about 500° C. to about 600° C., while Form II is produced at temperatures below about 500° C.

Different detergent formulations have different STPP bulk density requirements. For example, the low bulk density product, (generally 0.45–0.59 g/cc), is used in formulations where a rapid rate of dissolution is desired. Typically, medium density STPP is used in automatic dishwashing compositions, and the high density product (generally greater than 0.75 g/cc) is used in formulating heavy duty cleaners, as for example, floor and wall cleaners. Bulk density may be defined in terms of the weight of STPP which freely flows into a container of given volume. A convenient method for measuring bulk density, and the method used herein, is the Solvay Process Method 302A described in the Solvay Technical and Engineering Service Bulletin No. 9, (page 33) issued in 1944.

Prior art techniques for preparing granular STPP of various bulk density characteristics are disclosed, for example, in U.S. Pat. Nos. 3,233,967, 3,684,436, 3,932,590 and 3,761,573.

Most of the commercially produced granular low bulk density STPP is made by either spray drying an orthophosphate solution, and calcining the spray dried beads to convert the orthophosphate into STPP, or by agglomeration of a solid orthophosphate feed followed by calcination (see U.S. Pat. No. 3,233,967). One well recognized problem with the aforementioned spray dried product is that the STPP granules, being in the form of thin-walled hollow beads, have a high frangibility, i.e., are easily fractured. This presents problems in the preparation, handling and shipping of the granular product.

Consequently, a process which produces a granular low bulk density STPP product of low frangibility is desirable. Such a process which also uses a finely divided STPP feed material is especially desirable. In this regard, there are two important considerations. Firstly, all processes for producing granular STPP also produce undersize material which must be screened off. This material may be recycled if the process permits, or milled to produce powdered STPP and sold as such. Presently, however, the demand in the industry for granular STPP is increasing at a greater rate than that for powder, and manufacturers are faced with the problem of disposing of the excess powder. Secondly, many existing plant facilities have a limited ability for producing more than one bulk density range of granular STPP. This is the case with most rotary kiln processes, which typically produce a product having a bulk density of about 0.90–1.00 g/cc. A process utilizing finely divided STPP feed, to which existing plants could easily adapt, would therefore advantageously increase the granular yields of such plants and in certain instances, additionally increase flexibility in the range of bulk density production.

It is an object of the present invention to provide a process for producing a granular STPP product of low bulk density and low frangibility utilizing a finely divided sodium tripolyphosphate feed material. This process, in utilizing a finely divided STPP feed material, enables existing commercial facilities which produce granular STPP to increase their granular yield and further provides greater flexibility in the bulk density range of granular STPP that can be produced in certain types of facilities, e.g., most facilities utilizing rotary kiln processes.

Additional objects and advantages of the present invention are or will become apparent from the following disclosure and appended claims.

It has been unexpectedly discovered that a granular sodium tripolyphosphate product of low frangibility and having a bulk density within the range of from about 0.45 g/cc to about 0.59 g/cc can be prepared by a process which comprises spraying water in an amount from about 36% to about 130% in excess of the amount stoichiometrically required for formation of sodium tripolyphosphate hexahydrate, onto finely divided sodium tripolyphosphate feed material having a size distribution of at least 70% by weight −100 mesh and at least 95% by weight −50 mesh, to form an agglomerated product; calcining the agglomerated product to a temperature within the range of from about 320° C. to about 550° C., and recovering said granular sodium tripolyphosphate product.

The feed material used in the process of this invention is finely divided STPP having a particle size distribution of at least about 70% −100 mesh and at least 95% by weight −50 mesh. Suitable feed may be obtained for example from the undersize material screened off in the production of granular sodium tripolyphosphate or it may be STPP powder obtained from milling a more coarse STPP product. Such feed, when used in the process of this invention will produce a granular STPP product of low bulk density and low frangibility.

In carrying out the process of this invention, the finely divided STPP feed is agglomerated by spraying water thereon. It has been found that the amount of water sprayed in the agglomeration step is a critical factor in producing a granular product of low frangibility. Frangibility as described and reported herein is measured according to a test described in U.S. Pat. No. 3,337,468 issued to Metcalf et al on Aug. 20, 1967. According to this test, 100 g of granular material is placed on a U.S. Standard 100 mesh screen with three pure gum rubber balls 1⅜ inch in diameter and shaken for 15 minutes with a RO-TAP ® sieve shaker. Percent frangibility is a measure of the quantity of particles which pass through a 100 mesh screen. For low density 0.45 to 0.59 g/cc particles, a frangibility value below about 25%, and preferably below about 20% by weight, is generally required for commercial use. The amount of water sprayed should be within the range of from about 36% to about 130% in excess of the amount stoichiometrically required for formation to STPP hexahydrate. This is roughly equivalent to form about 40% to about 68% by weight, based on the weight of the dry STPP feed material. A low bulk density product can be obtained by agglomeration with less than the specified excess of water, however, such a product typically has an unacceptable high frangibility value. For example, a granular STPP product having a bulk density of 0.48 g/cc, obtained by spraying 33.9% of water based upon the weight of the dry STPP feed material, had a frangibility value of 37. (See Example II, Comparative Run M).

The term "water" is to be understood to mean pure water, or water containing minor amounts, that is less than 15% by weight, of sodium orthophosphate. Water containing such minor amounts of sodium orthophosphate may be used where it is desired to recycle water in a commercial production plant, obtained for example from scrubbing off-gases or from recovering minor orthophosphate spills. Where such orthophosphate-containing water is used, it is preferred that the Na to P molar ratio is about 1.67 to 1, which is the ratio stoichiometrically required for the production of sodium tripolyphosphate.

Preferably, the STPP feed material is subjected to agitation as it is sprayed. Equipment in which the agglomeration step may be carried out and which provide the preferred agitation include for example, a rotary disc granulator and a rotating horizontal drum hydrator with lifting flights (see also equipment described in U.S. Pat. Nos. 3,154,496 and 3,625,902). The spraying may be done by any of the conventional spraying means, which include, for example, air atomized or pneumatic spray nozzles.

The agglomerated product is then calcined to a temperature within the range of from about 320° C. to about 550° C. Typically, times on the order of about 15–40 minutes are employed in reaching the selected temperature, however, shorter or longer times may be used where desired.

A single reactor may be used to effect both the agglomeration and calcination steps, or a separate calciner may be used. The former may be desirable for example, where a horizontal drum agglomerator is used in the agglomeration step. In such instances, calcination may be effected by directly or indirectly heating the horizontal drum.

The agglomerated and calcined particles are generally screened to recover the desired granular fraction. For commercial purposes, this granular fraction is commonly from about −20 to +100 mesh, and is preferably −20 to +80 mesh. Such fractions are provided by the present invention. Typically, the calcined product is cooled prior to screening. When screening is done, the undersize material may be recycled as feed and the oversize material may be either milled to the size of the selected granular fraction and added thereto, or it may be milled to a powder and recycled as feed. Granular STPP products were obtained from the above described process having low frangibility values and having a bulk density within the range of from about 0.45 g/cc to about 0.59 g/cc.

The following examples are given to illustrate the present invention and are not deemed to be limiting thereof.

EXAMPLE I

Inventive Runs A through G

Finely divided STPP feed material was prepared by a conventional rotary calciner process. Phosphoric acid, soda ash and water were reacted in sufficient quantity to give a sodium phosphate solution having a molar ratio of Na to P of 1.67/1 and a density of 55° Baume at 100° C. The solution was evaporated to dryness and the product calcined to a temperature of about 510° C. in a rotary calciner to give a mixture of Phase I and Phase II STPP. The hot product from the calciner was cooled, crushed, and milled into essentially −100 mesh (U.S. Standard) powder. In each of the runs A through G, about 9,080 g of the −100 mesh STPP feed material were transferred to an 18 inch × 18 inch horizontal rotary drum agglomerator, equipped with 1 inch lift flights. The drum was rotated at 15 rpm. Agglomeration was effected by spraying room temperature tap water onto the rotating bed of STPP feed. The amount of water sprayed in a particular run (see Table I) was within the range of from about 40% to about 68% by weight, based on the weight of the dry STPP feed. (This is approximately from about 36% to about 130% in excess of the amount of water theoretically required to form STPP hexahydrate). The water was sprayed with an air atomized spray nozzle at a rate between 200 and 300 g/min. In each run, about 7,000–8,000 g of the agglomerated product were kept in the rotary drum for calcination. The lift flights were removed and a 1.5 inch diameter burner inserted to effect calcination. The aglomerated product was calcined to a selected temperature, (see Table I), within the range of from about 320° C. to about 550° C. to effect conversion into anhydrous STPP. The hot product was removed from the rotary drum, cooled in stainless steel trays and screened to separate the −20 +80 mesh granular fraction. Data on this granular fraction for the various runs, set forth in Table I, show that low bulk density STPP products, having low frangibility values, were obtained in good granular yields.

Comparative Run H

The same procedure and STPP feed material used in the above inventive runs were used in Run H, except that only 31.5% by weight of water was sprayed in the agglomeration step. The data set forth in Table I shows that the product obtained had a high frangibility value.

EXAMPLE II

Inventive Runs I through L

Finely divided STPP feed material was prepared as described in Example I except that the evaporated sodium phosphate solution was calcined at a temperature of 480° C. (instead of 510° C.) to give Phase II STPP (instead of a mixture of Phase I and Phase II). In all other respects, the procedure followed in carrying out Runs I through L was substantially the same as in the Inventive Runs of Example I. Data on the −20 +80 mesh granular fraction for the various runs, set forth in Table II, show that low bulk density STPP products, having low frangibility values, were obtained in good granular yields.

Comparative Run M

The same procedure of STPP feed material used in the above Inventive Runs were used in Run M except that only 33.9% by weight of water was sprayed in the agglomeration step. The data set forth in Table II shows that the product obtained had a high frangibility value.

EXAMPLE III

Inventive Runs N and N'

The finely divided STPP feed material used in this Example was an essentially −100 mesh mixture of Phase I and Phase II, prepared as in Example I. Agglomeration of the feed was carried out on a 14 inch diameter rotary disc, which was inclined to an angle of about 45° from the horizontal, and which was rotated at a speed of about 25 rpm. In Run N, the finely divided STPP was fed to the rotating disc and agglomerated by spraying thereon 56.8% by weight of room temperature tap water, based on the weight of the dry STPP feed. The spraying was done with an air atomized spray nozzle. Agglomerates formed and continued to grow until discharge occurred. About 9,000 g of the agglomerated product were transferred to an 18 × 18 inch horizontal drum equipped with a 1.5 inch diameter burner (same as in Example I) and calcined to a temperature of about 350° C. The hot product was removed from the drum, cooled in stainless steel trays and screened to separate the −20 +80 mesh granules. About 97% of the total product was +80 mesh, however about 77% of the product was +20 mesh oversize material. This oversize material was crushed in a laboratory granular mill and screened to separate the −20 +80 mesh granular fraction, which is designated Run N'.

Data on the screened granular fractions for both runs N and N', set forth in Table III, show that low bulk density STPP products, having low frangibility values were obtained, and that the total (combined) granular yield was good.

Comparative Run O

The same STPP feed material used in inventive Run N was used in Run O. The procedure used was substantially the same as in Run N except that only 31.2% by weight of water was sprayed in the agglomeration step. The agglomerated product was calcined to a temperature of 320° C., and the cooled clacined product screened to separate the −20 +80 mesh granules. The data set forth in Table III shows that the product obtained had a high frangibility value.

EXAMPLE IV

Inventive Runs P and P'

The finely divided STPP feed material used in the example was essentially −100 mesh Phase II material, prepared as in Example II. In all other respects, the procedure followed in carrying out Run P was substantially the same as in Inventive Run N of Example III. The agglomerated product was calcined to a temperature of 350° C., and the cooled calcined product screened to separate the −20 +80 mesh granules. About 94% of the total product was +80 mesh and about 37% of the product was +20 mesh oversize material. This oversize material was crushed in a laboratory granular mill and screened to separate the −20 +80 mesh granular fraction, which is designated Run P'. Data on the screened granular fractions for both Runs N and N', set forth in Table IV, show the low bulk density STPP products, having low frangibility values were obtained, and that although an acceptable granular yield was obtained for Run P, the total (combined) granular yield was excellent.

TABLE I

| Inventive Runs | % of Water Sprayed (Based on Weight of Dry STPP Feed Material) | Calcination Temperature °C | % Granular Yield | % Frangibility | Bulk Density g/cc |
|---|---|---|---|---|---|
| A | 47.0 | 350 | 75 | 14 | 0.47 |
| B | 50.0 | 330 | 65 | 14 | 0.48 |
| C | 55.5 | 350 | 77 | 16 | 0.51 |
| D | 57.2 | 350 | 75 | 15 | 0.50 |
| E | 65.8 | 350 | 73 | 9 | 0.53 |
| F | 53.6 | 450 | 73 | 6 | 0.54 |
| G | 65.3 | 480 | 76 | 6 | 0.56 |
| Comparative Run H | 31.5 | 320 | 49 | 60 | 0.39 |

TABLE II

| Inventive Runs | % of Water Sprayed (Based on Weight of Dry STPP Feed Material) | Calcination Temperature °C | % Granular Yield | % Frangibility | Bulk Density g/cc |
|---|---|---|---|---|---|
| I | 40.0 | 360 | 71 | 16 | 0.50 |
| J | 55.5 | 350 | 77 | 16 | 0.51 |
| K | 67.8 | 350 | 72 | 20 | 0.47 |
| L | 67.8 | 480 | 70 | 16 | 0.54 |
| Comparative Run M | 33.9 | 320 | 59 | 37 | 0.48 |

TABLE III

| Inventive Runs | % of Water Sprayed (Based on Weight of Dry STPP Feed Material) | Calcination Temperature °C | % Granular Yield | % Frangibility | Bulk Density g/cc | Total % Granular Yield |
|---|---|---|---|---|---|---|
| N | 56.8 | 350 | 20 | 9 | 0.57 | 75 |
| N' | (+20 mesh oversize material from Run N, representing 77% of Run N product, was milled into −20 +80 mesh granules) | | 71 | 15 | 0.50 | |
| Comparative Run O | 31.2 | 320 | 34 | 63 | 0.53 | — |

TABLE IV

| Inventive Runs | % of Water Sprayed (Based on Weight of Dry STPP Feed Material) | Calcination Temperature °C | % Granular Yield | % Frangibility | Bulk Density g/cc | Total % Granular Yield |
|---|---|---|---|---|---|---|
| P | 57.0 | 350 | 57 | 12 | 0.52 | 87 |
| P' | (+20 mesh oversize material from Run P, representing 37% of Run P product, was milled into −20 +80 mesh granules.) | | 81 | 12 | 0.51 | |

What is claimed is:

1. A process for preparing a granular sodium tripolyphosphate product of low frangibility and having a bulk density within the range of from about 0.45 g/cc to about 0.59 g/cc which comprises spraying water in an amount from about 36% to about 130% in excess of the amount stoichiometrically required for formulation of sodium tripolyphosphate hexahydrate, onto finely divided sodium tripolyphosphate feed material having a size distribution of at least 70% by weight −100 mesh and at least 95% by weight −50 mesh, to form an agglomerated product, calcining the agglomerated product at a temperature within the range of from about 320° C. to about 550° C., and recovering said granular sodium tripolyphosphate product.

2. Process of claim 1 in which the finely divided sodium tripolyphosphate feed material has a size of at least about 95% by weight −100 mesh.

3. Process of claim 1 in which the granular sodium tripolyphosphate product recovered is about −20 to +100 mesh.

4. Process of claim 1 in which the granular fraction recovered is −20 to +80 mesh.